(12) United States Patent
Chen et al.

(10) Patent No.: US 8,531,471 B2
(45) Date of Patent: Sep. 10, 2013

(54) SHARED VIRTUAL MEMORY

(75) Inventors: Hu Chen, Beijing (CN); Ying Gao, Beijing (CN); Zhou Xiaocheng, Beijing (CN); Shoumeng Yan, Beijing (CN); Peinan Zhang, Beijing (CN); Mohan Rajagopalan, Mountain View, CA (US); Jesse Fang, San Jose, CA (US); Avi Mendelson, Haifa (IL); Bratin Saha, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1290 days.

(21) Appl. No.: 12/317,853

(22) Filed: Dec. 30, 2008

(65) Prior Publication Data

US 2010/0118041 A1     May 13, 2010

Related U.S. Application Data

(60) Provisional application No. 61/199,095, filed on Nov. 13, 2008.

(51) Int. Cl.
*G06F 15/167*   (2006.01)
*G06F 12/00*    (2006.01)
*G06F 12/02*    (2006.01)
*G06F 12/10*    (2006.01)

(52) U.S. Cl.
USPC ........... 345/542; 345/541; 345/543; 345/544; 345/564; 345/565; 345/566; 345/568

(58) Field of Classification Search
USPC .......................... 345/541–544, 564–566, 568
See application file for complete search history.

(56) References Cited

U.S. PATENT DOCUMENTS

| | | | |
|---|---|---|---|
| 6,822,654 B1 * | 11/2004 | Trivedi et al. | 345/520 |
| 7,528,838 B2 | 5/2009 | Gosalia | |
| 7,685,371 B1 * | 3/2010 | Duncan et al. | 711/135 |
| 2006/0098022 A1 | 5/2006 | Andrews et al. | |
| 2006/0164425 A1 | 7/2006 | Parke | |
| 2008/0030510 A1 | 2/2008 | Wan et al. | |
| 2008/0040565 A1 * | 2/2008 | Rozas et al. | 711/163 |
| 2008/0109795 A1 * | 5/2008 | Buck et al. | 717/137 |

FOREIGN PATENT DOCUMENTS

EP     1589433     10/2005

OTHER PUBLICATIONS

Korean Patent Office, Combined Search Report and Written Opinion for PCT Application No. PCT/US2009/063368, dated Jun. 22, 2010, 9 pgs.
EP Supplement Search Report issued in corresponding EP 09 82 6579.6 dated Jan. 30, 2013, 3 pages.

* cited by examiner

*Primary Examiner* — Ke Xiao
*Assistant Examiner* — Jed-Justin Imperial
(74) *Attorney, Agent, or Firm* — Trop, Pruner & Hu, P.C.

(57) ABSTRACT

Embodiments of the invention provide a programming model for CPU-GPU platforms. In particular, embodiments of the invention provide a uniform programming model for both integrated and discrete devices. The model also works uniformly for multiple GPU cards and hybrid GPU systems (discrete and integrated). This allows software vendors to write a single application stack and target it to all the different platforms. Additionally, embodiments of the invention provide a shared memory model between the CPU and GPU. Instead of sharing the entire virtual address space, only a part of the virtual address space needs to be shared. This allows efficient implementation in both discrete and integrated settings.

15 Claims, 6 Drawing Sheets

SHARED VIRTUAL MEMORY

RELATED APPLICATION

This application claims the benefit of provisional patent application No. 61/199,095, filed on Nov. 13, 2008, entitled "Shared Virtual Memory." This application is also related to U.S. patent application Serial No. unknown, entitled "Language Level Support for Shared Virtual Memory," filed concurrently herewith on Dec. 30, 2008.

BACKGROUND

This relates generally to shared virtual memory implementations.

The computing industry is moving towards a heterogeneous platform architecture consisting of a general purpose CPU along with programmable GPUs attached both as a discrete or integrated device. These GPUs are connected over both coherent and non-coherent interconnects, have different industry standard architectures (ISAs) and may use their own operating systems.

Computing platforms composed of a combination of a general purpose processor (CPU) and a graphics processor (GPU) have become ubiquitous, especially in the client computing space. Today, almost all desktop and notebook platforms ship with one or more CPUs along with an integrated or a discrete GPU. For example, some platforms have a processor paired with an integrated graphics chipset, while the remaining use a discrete graphics processor connected over an interface, such as PCI-Express. Some platforms ship as a combination of a CPU and a GPU. For example, some of these include a more integrated CPU-GPU platform while others include a graphics processor to complement integrated GPU offerings.

These CPU-GPU platforms may provide significant performance boost on non-graphics workloads in image processing, medical imaging, data mining, and other domains. The massively data parallel GPU may be used for getting high throughput on the highly parallel portions of the code. Heterogeneous CPU-GPU platforms may have a number of unique architectural constraints such as:

The GPU may be connected in both integrated and discrete forms. For example, some graphics processors are integrated with the chipset. On the other hand other current GPUs are attached in a discrete manner over an interface such as PCI-Express. While the hardware may provide cache coherence between a CPU and integrated graphics processor, it may be difficult to do that for a discrete GPU. A system may also have a hybrid configuration where a low-power lower-performance GPU is integrated with a CPU, with a higher-performance discrete GPU. Finally, a platform may also have multiple GPU cards.

The CPU and GPU may have different operating systems. For example, a processor may have its own operating system kernel. This means that the virtual memory translation schemes may be different between the CPU and GPU. The same virtual address may be simultaneously mapped to two different physical addresses through two different page tables on the CPU and GPU. This also means that the system environment (loaders, linkers, etc.) may be different between the CPU and GPU. For example, the loader may load the application at different base addresses on the CPU and GPU.

The CPU and the GPU may have different ISAs and hence the same code may not be run on both the processors.

DETAILED DESCRIPTION

Embodiments of the invention provide a programming model for CPU-GPU platforms. In particular, embodiments of the invention provide a uniform programming model for both integrated and discrete devices. The model also works uniformly for multiple GPU cards and hybrid GPU systems (discrete and integrated). This allows software vendors to write a single application stack and target it to all the different platforms. Additionally, embodiments of the invention provide a shared memory model between the CPU and GPU. Instead of sharing the entire virtual address space, only a part of the virtual address space needs to be shared. This allows efficient implementation in both discrete and integrated settings. Furthermore, language annotations may be used to demarcate code that must run on the GPU. Language support may be extended to include features such as function pointers.

Embodiments of the shared memory model provide a novel programming paradigm. In particular, data structures may be seamlessly shared between the CPU and GPU, and pointers may be passed from one side to the other without requiring any marshalling. For example, in one embodiment a game engine may includes physics, artificial intelligence (AI), and rendering. The physics and AI code may be best executed on the CPU, while the rendering may be best executed on the GPU. Data structures may need to be shared, such as the scene graph, between the CPU & GPU. Such an execution model may not be possible in some current programming environments since the scene graph would have to be serialized (or marshaled) back and forth. However, in embodiments of the shared memory model, the scene graph may simply reside in shared memory and be accessed both by the CPU and GPU.

In one embodiment, the full programming environment, including the language and runtime support, is implemented. A number of highly parallel non-graphics workloads may be ported to this environment. The implementation may work on heterogeneous operating systems, i.e. with different operating systems running on the CPU and GPU. Moreover, user level communication may be allowed between the CPU and GPU. This may make the application stack more efficient since the overhead of the OS driver stack in CPU-GPU communication may be eliminated. The programming environment may be ported to two different heterogeneous CPU-GPU platform simulators—one simulates the GPU attached as a discrete device to the CPU, while the other simulates an integrated CPU-GPU platform.

In summary, embodiments of the programming model for CPU-GPU platforms may:

Provide a uniform programming model for discrete, integrated, multi-GPU cards and hybrid GPU configurations.

Provide shared memory semantics between the CPU and GPU allowing pointers to be passed and data structures to be shared freely between the CPU and GPU Be implemented in a heterogeneous CPU-GPU platform with different ISAs and different operating systems on the CPU and GPU.

Enable user-level communication between the CPU and GPU thus making the application stack much more efficient.

Memory Model

Figure 1:
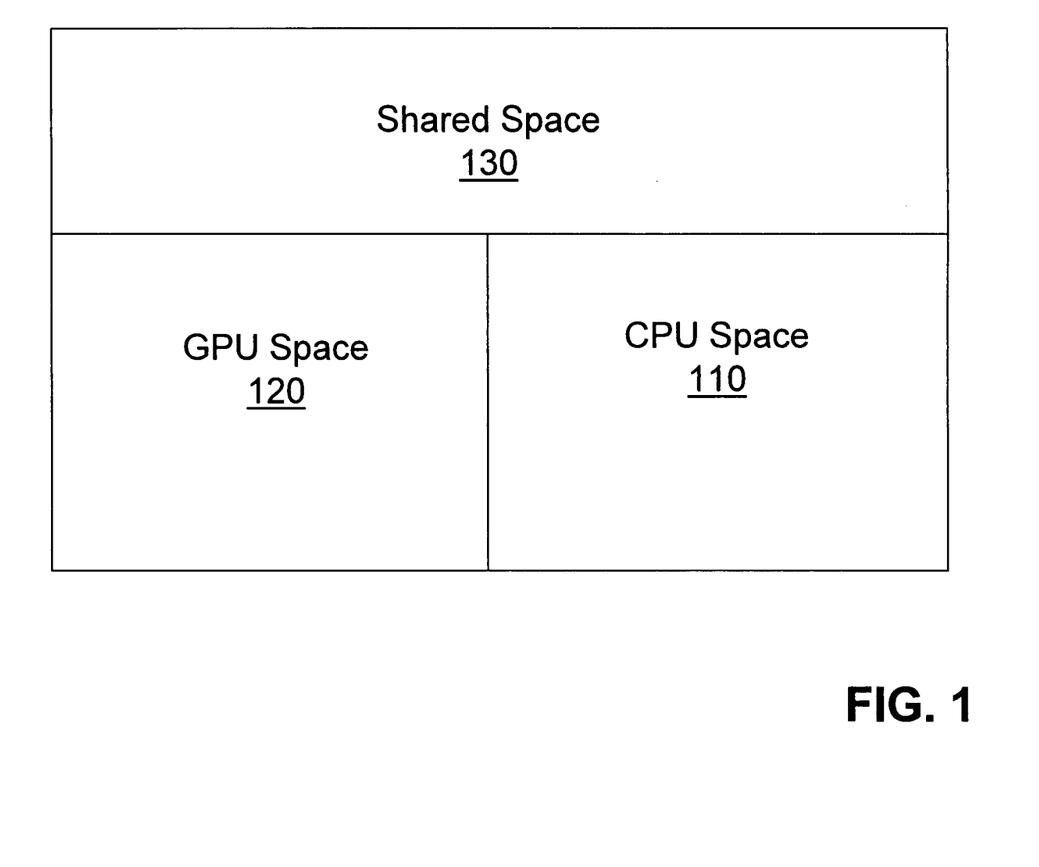
FIG. 1 is a depiction of a CPU-GPU memory model in accordance with one embodiment.

FIG. 1 is a depiction of a GPU-CPU memory model in accordance with one embodiment. In one embodiment, the memory model 100 provides a window of shared virtual addresses 130 between the CPU 110 and GPU 120, such as in partitioned global address space (PGAS) languages. Any data structure that is shared between the CPU 110 and GPU 120 typically must be allocated by the programmer in this space 130. The system may provide a special malloc function that allocates data in this space 130. Static variables may be annotated with a type quantifier to have them allocated in the shared window 130. However, unlike PGAS languages there is no notion of affinity in the shared window. This is because data in the shared space 130 migrates between the CPU and GPU caches as it gets used by each processor. Also unlike PGAS implementations, the representation of pointers does not change between the shared and private spaces. The remaining virtual address space is private to the CPU 110 and GPU 120. By default data gets allocated in this space 130, and is not visible to the other side. This partitioned address space approach may cut down on the amount of memory that needs to be kept coherent and enables a more efficient implementation for discrete devices.

The embodiment of the memory model may be extended to multi-GPU and hybrid configurations. In particular, the window of shared virtual addresses may be extended across all the devices. Any data structures allocated in this shared address window 130 may be visible to all agents and pointers in this space may be freely exchanged. In addition, every agent has its own private memory.

Release consistency in the shared address space may be used due to several reasons. First, the system only needs to remember all the writes between successive release points, not the sequence of individual writes. This may make it easier to do bulk transfers at release points (e.g. several pages at a time), which may be important in the discrete configuration. Second, it allows memory updates to be kept completely local until a release point, which may be important in a discrete configuration. Third, the release consistency model may be a good match for the programming patterns in CPU-GPU platforms since there are natural release and acquire points. For example a call from the CPU into the GPU is one such point. Making any of the CPU updates visible to the GPU before the call may not serve any purpose, and neither does it make any sense to enforce any order on how the CPU updates become visible as long as all of them are visible before the GPU starts executing. Furthermore, the proposed C/C++ memory model may be mapped easily to shared memory space. In general, race-free programs may not get affected by the weaker consistency model of the shared memory space. The implementation may not need to be restrained to provide stronger guarantees for racy programs. However different embodiments may choose to provide different consistency models for the shared space.

Figure 2:
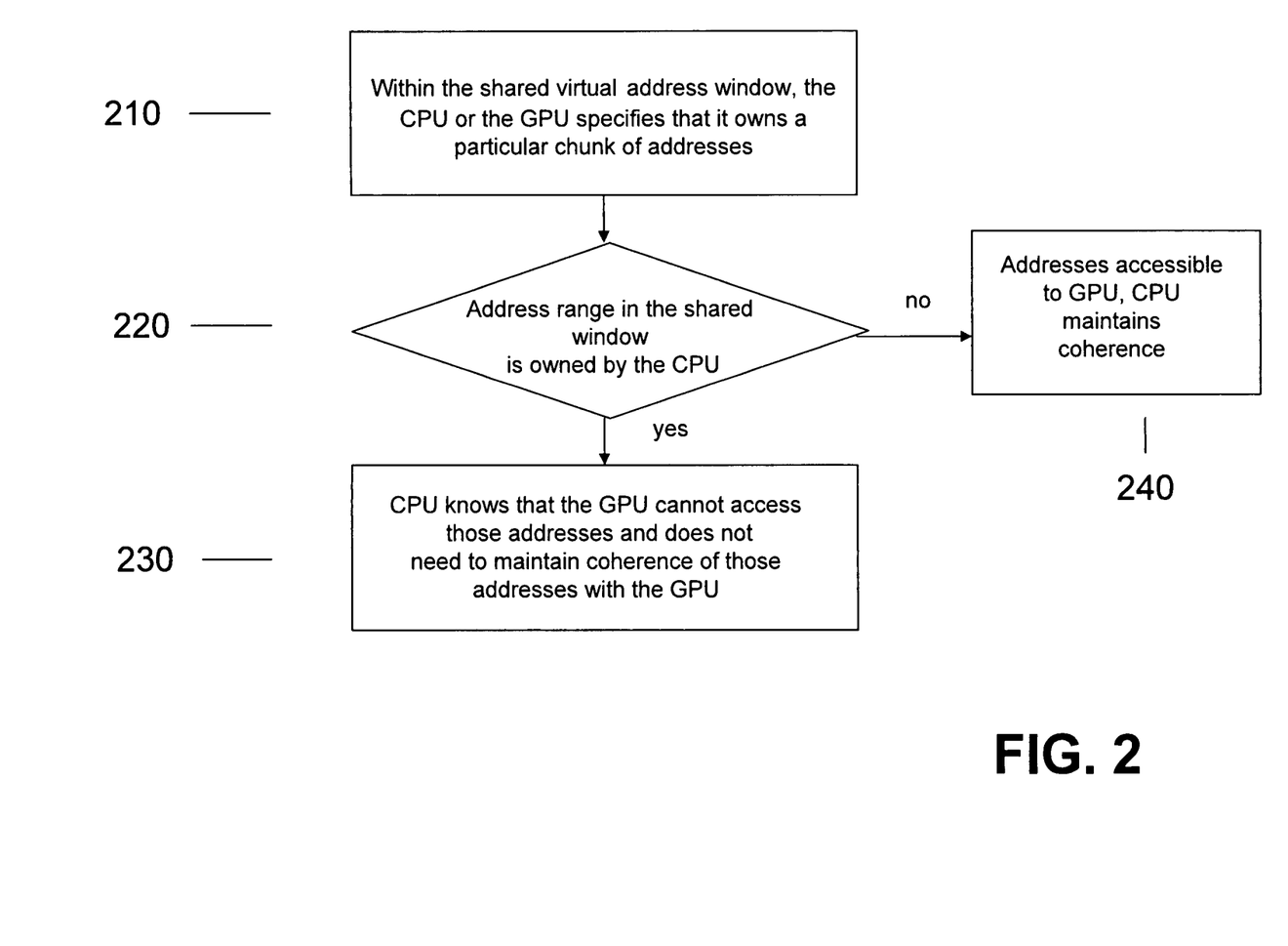
FIG. 2 is a flow chart for one embodiment of the shared memory model augmented with ownership rights.

FIG. 2 is a flow chart for one embodiment of the shared memory model augmented with ownership rights. A sequence 200 may be implemented in firmware, software, or hardware. Software embodiments may be stored on a computer-readable medium such as an optical disk, a magnetic disk, or a semiconductor memory. In particular, embodiments of the shared memory model may be augmented with ownership rights to enable further coherence optimizations. Within the shared virtual address window, the CPU or the GPU may specify that it owns a particular chunk of addresses (block 210). If an address range in the shared window is owned by the CPU (block 220), then the CPU knows that the GPU cannot access those addresses and hence does not need to maintain coherence of those addresses with the GPU (block 230). For example, it can avoid sending any snoops or other coherence information to the GPU. The same is true of GPU owned addresses. If a CPU owned address is accessed by the GPU, then the address becomes un-owned (with symmetrical behavior for GPU owned addresses). Alternatively, an access to a CPU (GPU) owned address by the GPU (CPU) may trigger an error condition.

Embodiments of the invention may provide these ownership rights to leverage common CPU-GPU usage models. For example, the CPU first accesses some data (e.g. initializing a data structure), and then hands it over to the GPU (e.g. computing on the data structure in a data parallel manner), and then the CPU analyzes the results of the computation and so on. The ownership rights allow an application to inform the system of this temporal locality and optimize the coherence implementation. Note that these ownership rights are optimization hints and it is legal for the system to ignore these hints.

Privatization and Globalization

In one embodiment, shared data may be privatized by copying from shared space to the private space. Non-pointer containing data structures may be privatized simply by copying the memory contents. While copying pointer containing data structures, pointers into shared data must be converted to pointers into private data.

Private data may be globalized by copying from the private space to the shared space and made visible to other computations. Non-pointer containing data structures may be globalized simply by copying the memory contents. While copying pointer containing data structures, pointers into private data must be converted as pointers into shared data (converse of the privatization example).

For example, in one embodiment, consider a linked list of nodes in private and shared space. The type definition for the private linked list is standard:

```
typedef struct {
    int val; // just an int field
    Node* next;
} Node;
```

The type definition for the shared linked list is shown below. Note that the pointer to the next node is defined to reside in shared space. The user must explicitly declare both the private and shared versions of a type.

```
typedef struct {
    shared int val;
    shared Node *shared next;
} shared Node;
```

Now the user may explicitly copy a private linked list to shared space by using the following:

```
...
myNode = (shared Node*) sharedMalloc(..);
// head points to the private linked list
myNode->val = head->val
myNode->next = (shared Node*) sharedMalloc(..);
...
```

The runtime API used by the compiler is shown below:

```
// Allocate and free memory in the private address
space. Maps to regular malloc
void* privateMalloc(int);
void privateFree(void*);
//Allocation & free from the shared space.
shared void* sharedMalloc (size_t size);
void sharedFree(shared void *ptr);
// Memory consistency for shared memory
void sharedAcquire( );
void sharedRelease( );
```

Finally, the runtime also provides APIs for mutexes and barriers to allow the application to perform explicit synchronization. These constructs are always allocated in the shared area.

The language provides natural acquire and release points. For example, a call from the CPU to GPU is a release point on the CPU followed by an acquire point on the GPU. Similarly, a return from the GPU is a release point on the GPU and an acquire point on the CPU. Taking ownership of a mutex and releasing a mutex are acquire and release points respectively for the processor doing the mutex operation, while hitting a barrier and getting past a barrier are release and acquire points as well.

In one embodiment, the runtime system may provide API calls for ownership acquisition and release. For example sharedMemoryAcquire( ) and sharedMemoryRelease( ) may acquire and release ownership of the entire memory range. Alternatively, the system may provide sharedMemoryAcquire(addr, len) and sharedMemoryRelease(addr, len) to acquire ownership within a particular address range.

Implementation

In one embodiment, the compiler generates two binaries—one for execution on the GPU and another for CPU execution. Two different executables are generated since the two operating systems may have different executable formats. The GPU binary contains the code that will execute on GPU, while the CPU binary contains the CPU functions. The runtime library has a CPU and GPU component which are linked with the CPU and GPU application binaries to create the CPU and GPU executables. When the CPU binary starts executing, it calls a runtime function that loads the GPU executable. Both the CPU and GPU binaries create a daemon thread that is used for CPU-GPU communication.

Implementing CPU-GPU Shared Memory

Figure 3:
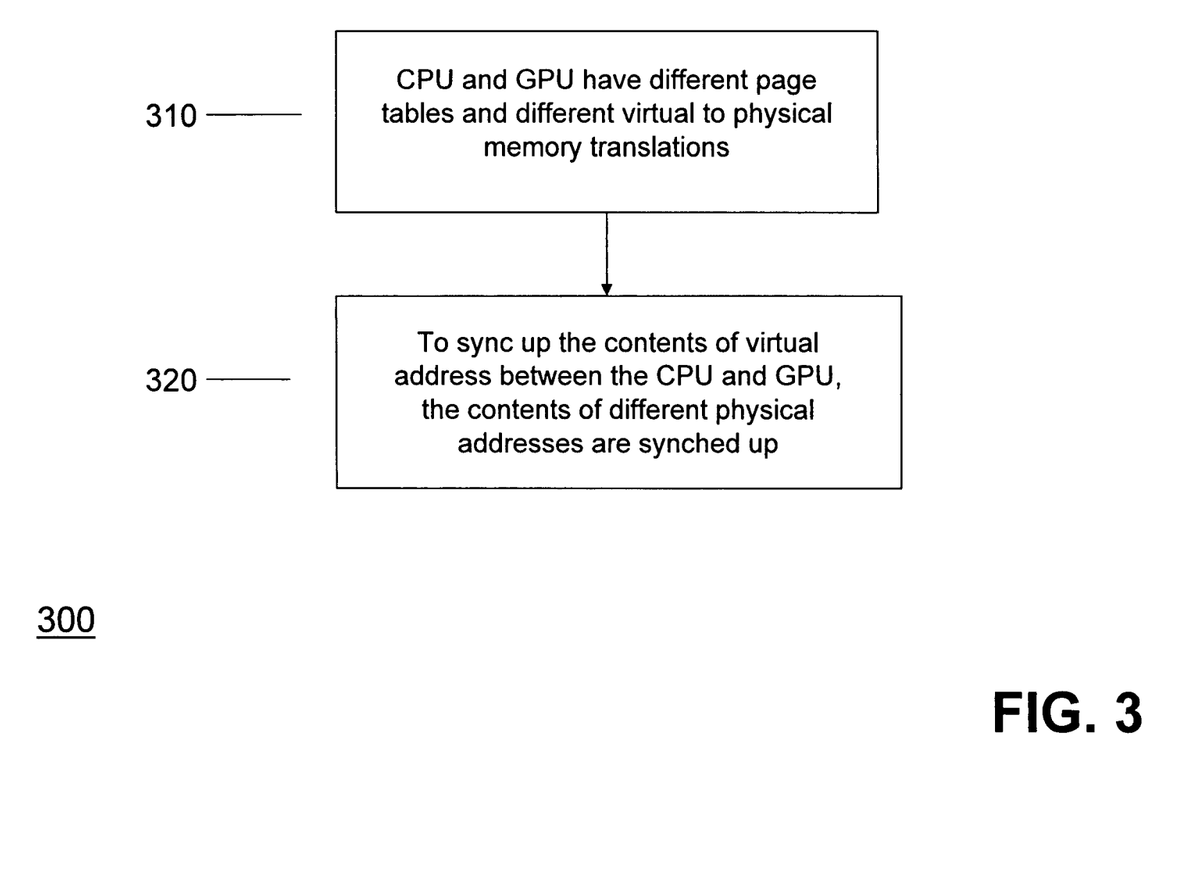
FIG. 3 is a flow chart for one embodiment of the shared memory model.

FIG. 3 is a flow chart for one embodiment of the shared memory model. A sequence 300 may be implemented in firmware, software, or hardware. In one embodiment, the CPU and GPU may have different page tables and different virtual to physical memory translations (block 310). Thus, to sync up the contents of virtual address V between the CPU and GPU (e.g. at a release point), the contents of different physical addresses, for example P1 on CPU and P2 on GPU, are synched up (block 320). The CPU however may not have access to the GPUs page tables (and hence does not know P2) and the GPU does not have access to the CPUs page tables and does not know P1.

Figure 4:
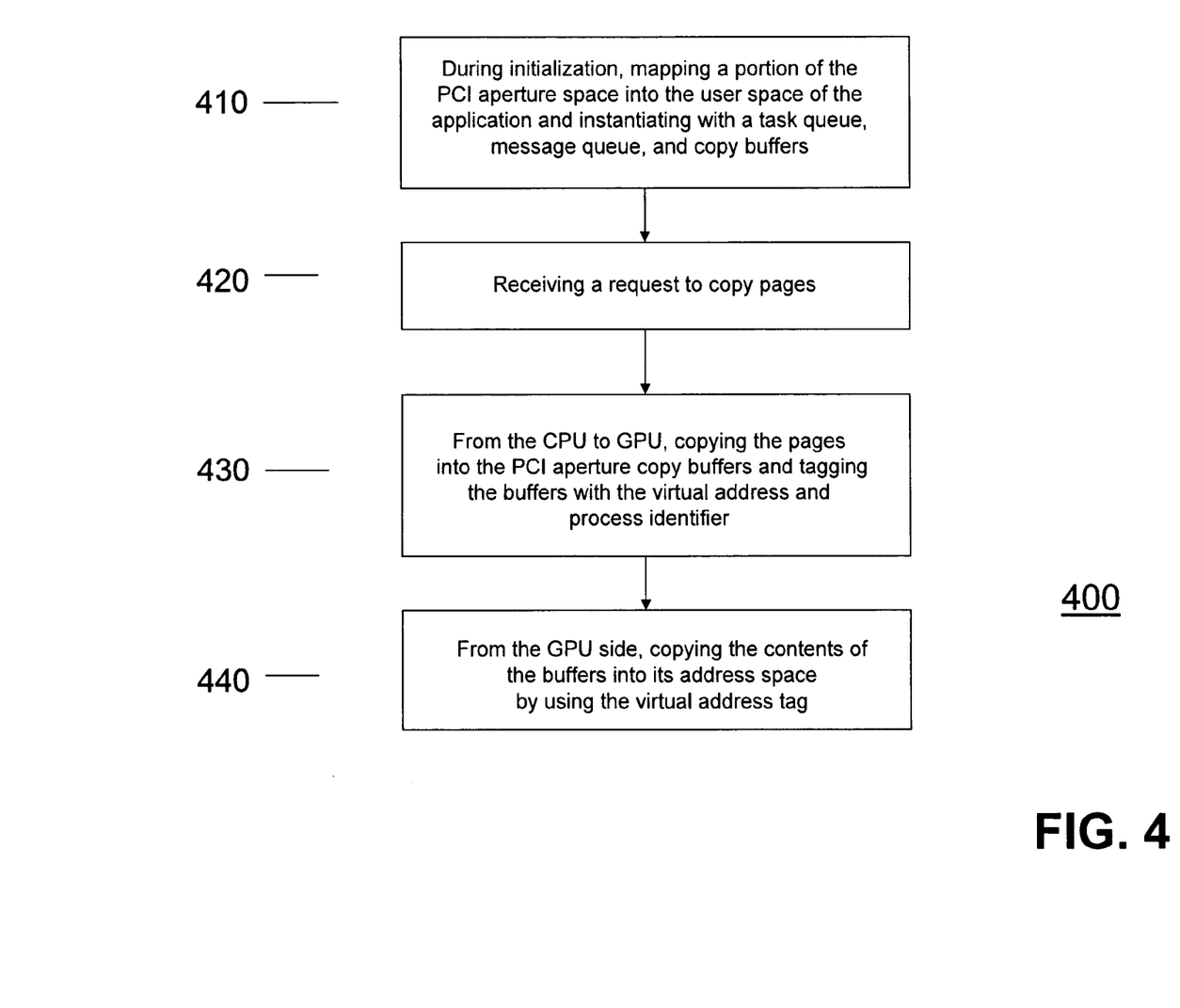
FIG. 4 is a flow chart for one embodiment of the shared memory model that leverages the PCI aperture.

This problem may be solved by leveraging the PCI aperture in a novel way. FIG. 4 is a flow chart for one embodiment of the shared memory model that leverages the PCI aperture. A sequence 400 may be implemented in firmware, software, or hardware. During initialization, a portion of the PCI aperture space may be mapped into the user space of the application and instantiated with a task queue, a message queue, and copy buffers (block 410). When there is a need to copy pages (block 420), for example from the CPU to GPU, the runtime copies the pages into the PCI aperture copy buffers and tags the buffers with the virtual address and the process identifier (block 430). On the GPU side, the daemon thread copies the contents of the buffers into its address space by using the virtual address tag (block 440). Thus the copy may be performed in a 2 step process—the CPU copies from its address space into a common buffer (PCI aperture) that both CPU and GPU may access, while the GPU picks up the pages from the common buffer into its address space. GPU-CPU copies are done in a similar way. Since the aperture is pinned memory, the contents of the aperture are not lost if the CPU or GPU process gets context switched out. This allows the two processors to execute asynchronously which may be critical since the two processors may have different operating systems and hence the context switches may not be synchronized. Furthermore, the aperture space may be mapped into the user space of the applications thus enabling user level CPU-GPU communication. This makes the application stack vastly more efficient than going through the OS driver stack.

Embodiments of the invention may exploit another difference between traditional software DSMs and CPU-GPU platforms. Traditional DSMs were designed to scale on medium to large clusters. In contrast, CPU-GPU systems are very small scale clusters. It is unlikely that more than a handful of GPU cards and CPU sockets will be used well into the future. Moreover, the PCI aperture provides a convenient shared physical memory space between the different processors.

Figure 5:
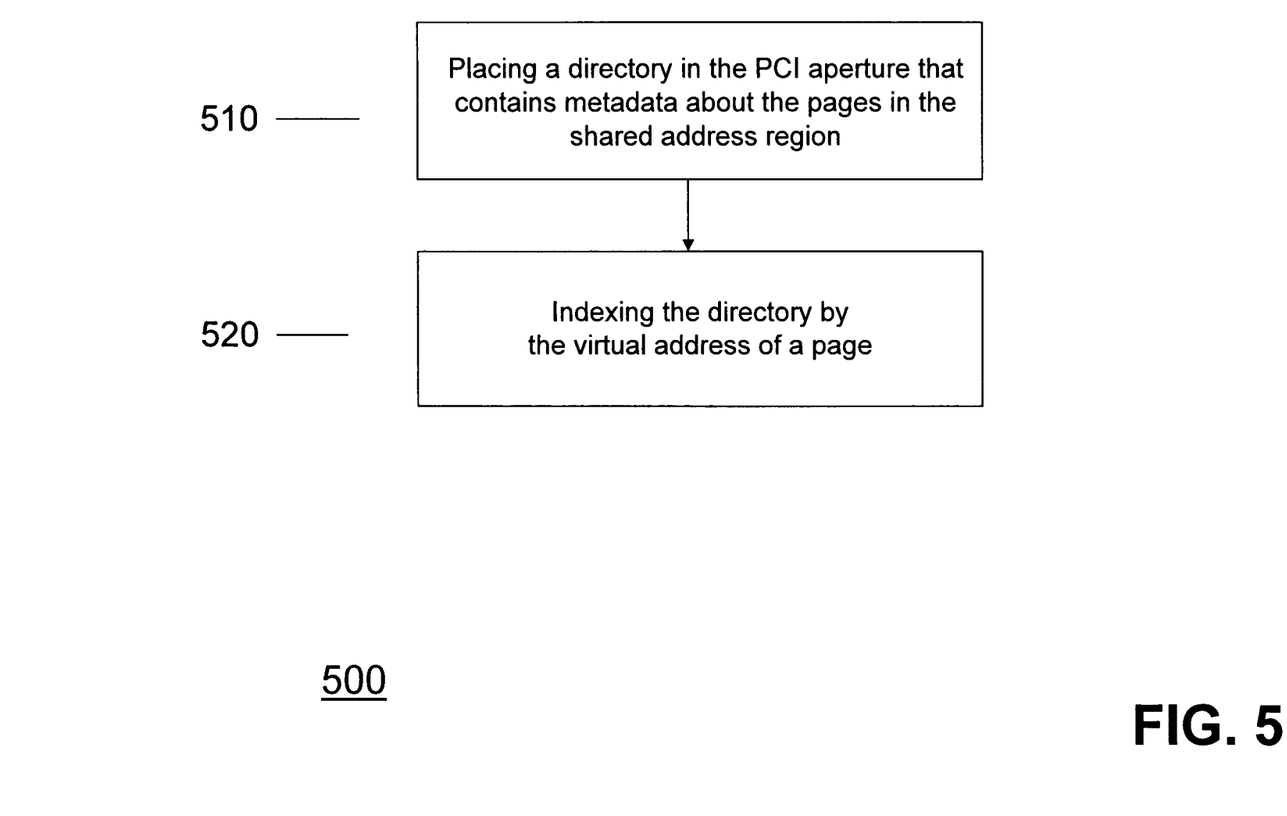
FIG. 5 is a flow chart for one embodiment of the shared memory model that leverages the PCI aperture.

Embodiments of the invention are able to centralize many data structures and make the implementation more efficient. FIG. 5 is a flow chart for one embodiment of the shared memory model that leverages the PCI aperture. A sequence 500 may be implemented in firmware, software, or hardware. Referring to block 510, a directory may be put in the PCI aperture that contains metadata about the pages in the shared address region. The metadata says whether the CPU or GPU holds the golden copy of a page (home for the page), contains a version number that tracks the number of updates to the page, mutexes that are acquired before updating the page, and miscellaneous metadata. The directory may be indexed by the virtual address of a page (block 520). Both the CPU and the GPU runtime systems maintain a similar private structure that contains the local access permissions for the pages, and the local version numbers of the pages.

Figure 6:
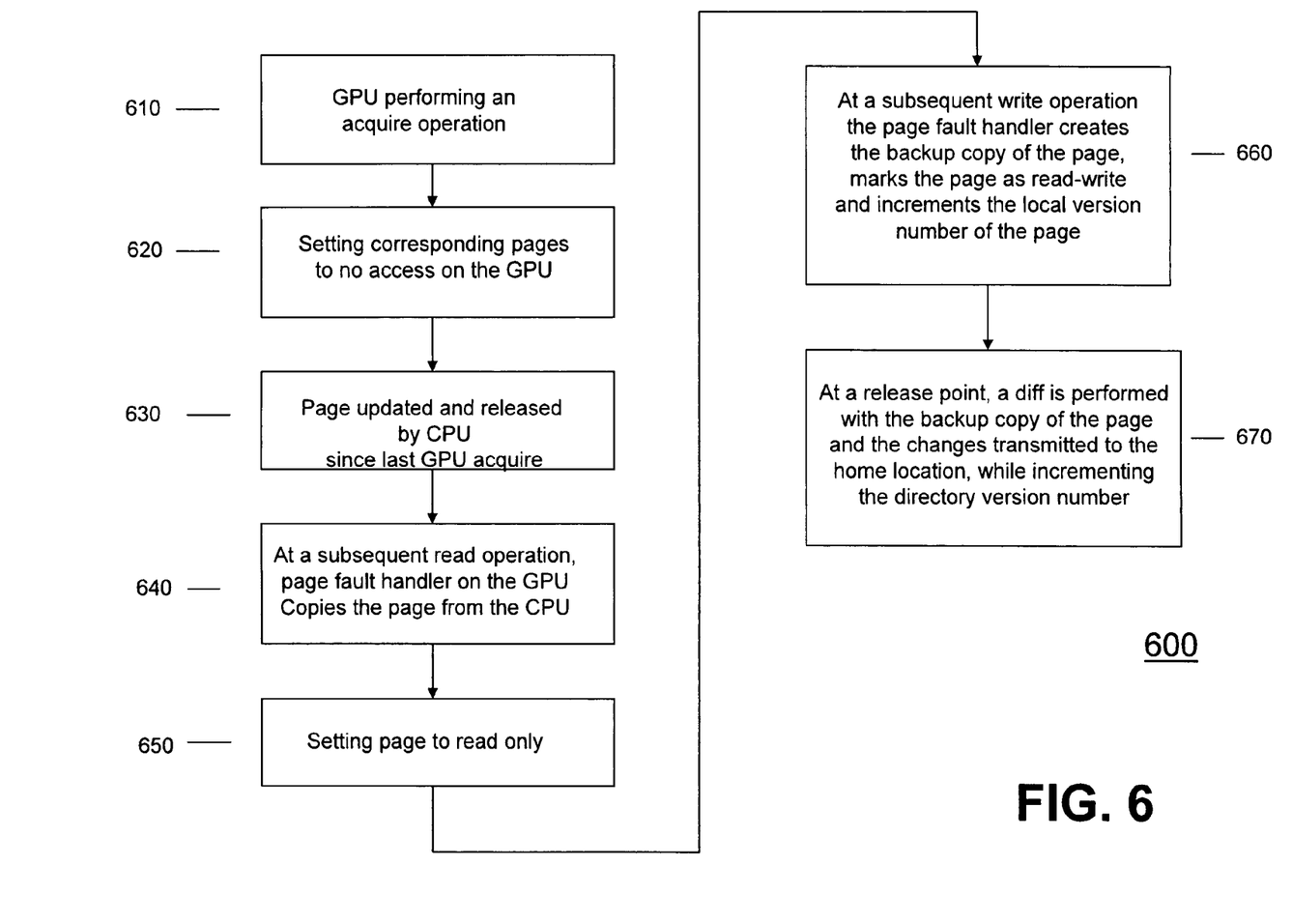
FIG. 6 is a flow chart for one embodiment of the shared memory model in operation.

FIG. 6 is a flow chart for one embodiment of the shared memory model in operation. A sequence 500 may be implemented in firmware, software, or hardware. In one embodiment, a sequence 600 may be implemented in firmware, software, or hardware. When the GPU performs an acquire operation (block 610), the corresponding pages may be set to no-access on the GPU (620). At a subsequent read operation the page fault handler on the GPU copies the page from the CPU (block 640) if the page has been updated and released by the CPU since the last GPU acquire (block 630). The directory and private version numbers may be used to determine this. The page is then set to read-only(block 650). At a subsequent write operation the page fault handler creates the backup copy of the page, marks the page as read-write and increments the local version number of the page (block 660). At a release point, a diff is performed with the backup copy of the page and the changes transmitted to the home location, while incrementing the directory version number (block 670). The diff operation computes the differences in the memory locations between the two pages (i.e. the page and its backup) to find out the changes that have been made. The CPU operations are done in a symmetrical way. Thus, between acquire and release points the GPU and CPU operate out of their local memory and caches and communicate with each other only at the explicit synchronization points.

At startup the implementation decides the address range that will be shared between CPU and GPU, and makes sure that this address range always remains mapped (e.g. using mmap on Linux). This address range may grow dynamically, and does not have to be contiguous, though in a 64 bit address space the runtime system may reserve a continuous chunk upfront.

Embodiments of the invention may be implemented in a processor-based system that may include a general-purpose processor coupled to a chipset in one embodiment. The chipset may be coupled to a system memory and a graphics processor. The graphics processor may be coupled to a frame buffer, in turn coupled to a display. In one embodiment, the embodiments of the invention shown in FIGS. 1-6 may be implemented as software stored in a computer-readable medium, such as the system memory. However, embodiments of the present invention may be also implemented in hardware or firmware.

Conclusion

Embodiments of the programming model provide a shared memory model for CPU-GPU platforms which enables fine-grain concurrency between the CPU and GPU. The uniform programming model may be implemented for both discrete and integrated configurations as well as for multi-GPU and hybrid configurations. User annotations may be used to demarcate code for CPU and GPU execution. User level communication may be provided between the CPU and GPU thus eliminating the overhead of OS driver calls. A full software stack may be implemented for the programming model including compiler and runtime support.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method providing:

sharing memory semantics between a central processing unit (CPU) and a graphics processing unit (GPU) including allowing pointers to be passed and data structures to be shared as is between the CPU and GPU;

allowing the same data structure stored in shared memory to be accessed by both the GPU and CPU;

determining if the CPU and GPU have different page tables and different virtual to physical memory translations;

in response to different page tables and different virtual to physical memory translations, synchronizing contents of virtual address between the CPU and GPU and contents of different physical addresses;

wherein in response to different page tables and different virtual to physical memory translations, synchronizing the contents of virtual address between the CPU and GPU and the contents of different physical addresses further comprises:

during initialization, mapping a portion of a PCI aperture that is accessible to both the CPU and GPU into the user space of an application and instantiating a user space with a task queue, a message queue, and copy buffers;

for copying pages from the CPU to the GPU, copying pages from the CPU address space into the PCI aperture and having the GPU access the pages from the PCI aperture into its address space; and for copying pages from the GPU to the CPU, copying pages from the GPU address space into the PCI aperture and having the CPU access the pages from the PCI aperture into its address space.

2. The method claimed in claim 1, further comprising:

sharing addresses between the CPU and GPU including allocating to a memory space a data structure that is shared as is between the CPU and GPU.

3. The method claimed in claim 1, further comprising: sharing virtual addresses between the CPU and GPU but having the virtual addresses map to different physical addresses on the CPU and GPU.

4. The method claimed in claim 3, wherein allocating to the memory space a data structure that is shared as is between the CPU and GPU further comprises using a malloc function that allocates data in the memory space.

5. The method claimed in claim 4 wherein allocating to the memory space a data structure that is shared between the CPU and GPU further comprises programmer annotation of static variables to have said variable allocated in the shared memory space.

6. The method claimed in claim 1 further comprising:

migrating data shared in a memory space between the CPU and GPU memory on demand as it gets used by either the CPU or GPU.

7. The method claimed in claim 1, further comprising partitioning address space into a shared address space between the CPU and GPU, and a remaining address space that is private to the CPU or GPU; and allocating default data to the private space.

8. The method claimed in claim 7, wherein a representation of pointers does not change between shared and private spaces.

9. The method claimed in claim 7, further comprising:

the CPU or GPU specifying that it owns a particular chunk of addresses within a shared virtual address space.

10. The method claimed in claim 7, wherein the CPU or GPU specifying that it owns a particular chunk of addresses within a shared virtual address space further comprises:
- when an address range in the shared virtual address space is owned by the CPU, the CPU knows that the GPU cannot access those addresses and does not need to maintain coherence of those addresses with the GPU; and
- when the CPU owned address is accessed by the GPU, the address becomes un-owned.

11. The method claimed in claim 1, wherein the PCI aperture may be mapped into the user space of the applications thus enabling user level CPU and GPU communication.

12. The method claimed in claim 11, further comprising:
- placing a directory in the PCI aperture that contains metadata about the pages in a shared address region, wherein the metadata indicates whether the CPU or GPU holds a home for the page, contains a version number that tracks a number of updates to the page, and mutexes that are acquired before updating the page.

13. The method claimed in claim 12, wherein the directory may be indexed by the virtual address of a page.

14. The method claimed in claim 1, wherein the GPU comprises a discrete or integrated device or a combination of multiple GPUs in different configurations.

15. The method claimed in claim 1, further comprising sharing memory semantics uniformly for multiple graphics cards and hybrid graphics systems.

\* \* \* \* \*